United States Patent [19]

McMahan

[11] 4,412,275

[45] Oct. 25, 1983

[54] SUPPORT HOUSING FOR A VEHICLE HEADLAMP

[75] Inventor: David R. McMahan, Anderson, Ind.

[73] Assignee: General Motors Corporation, Detroit, Mich.

[21] Appl. No.: 450,683

[22] Filed: Dec. 17, 1982

[51] Int. Cl.³ .............................................. F21V 21/26
[52] U.S. Cl. ..................................... 362/269; 362/80; 362/83; 362/287; 362/289; 362/371; 362/428; 362/374; 362/375
[58] Field of Search ............... 362/269, 287, 289, 371, 362/428, 83, 80, 374, 375

[56] References Cited

U.S. PATENT DOCUMENTS

| | | | |
|---|---|---|---|
| 4,149,229 | 4/1979 | Draper | 362/349 |
| 4,277,818 | 7/1981 | Urbanek et al. | 362/267 |
| 4,345,307 | 8/1982 | Mayer et al. | 362/369 |

Primary Examiner—Stephen J. Lechert, Jr.
Attorney, Agent, or Firm—Edward J. Biskup

[57] ABSTRACT

A support housing for a vehicle headlamp that includes a pair of pivotally interconnected ring members adjustable about a pair of mutually perpendicular pivot axes by a pair of vertically oriented adjustment screws which are located to the rear of the headlamp and within the peripheral confines of the headlamp lens.

3 Claims, 14 Drawing Figures

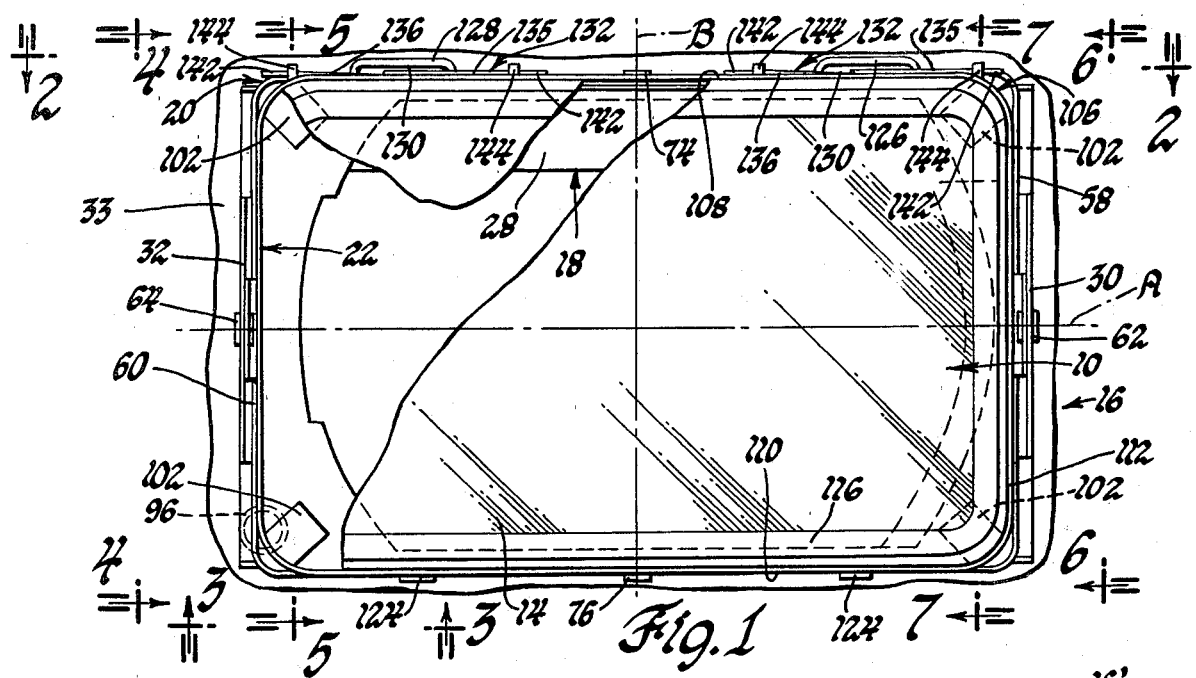
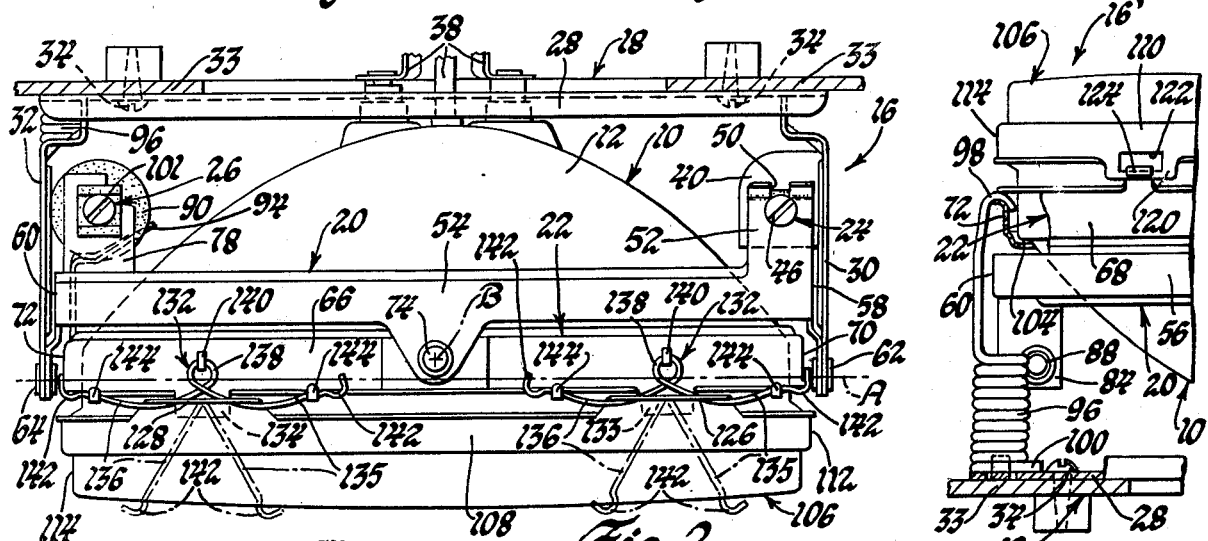
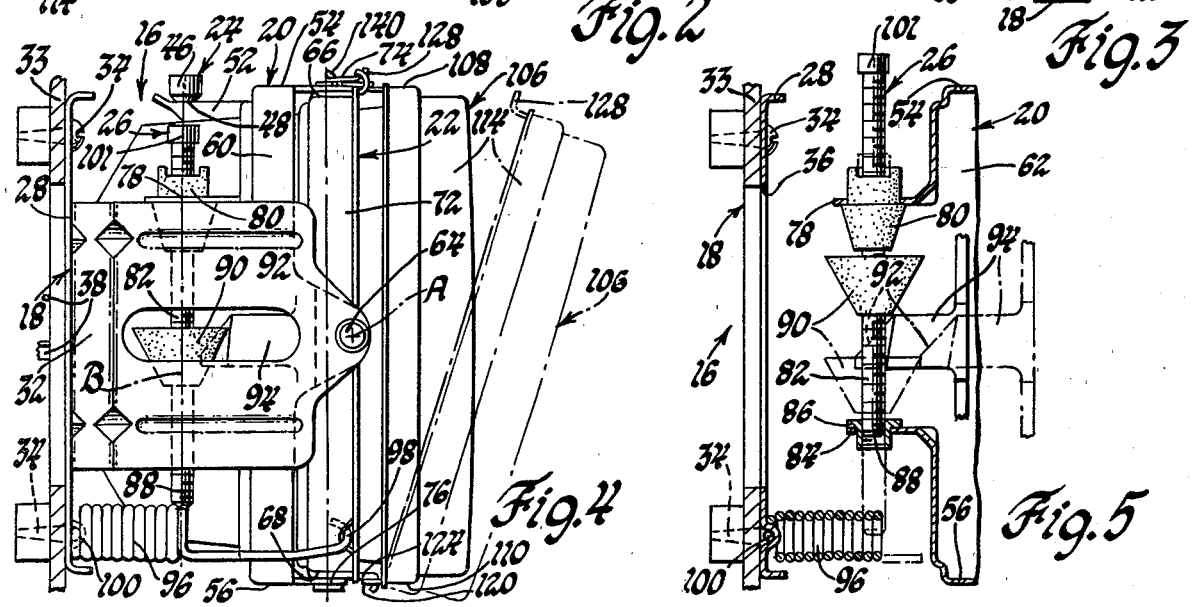

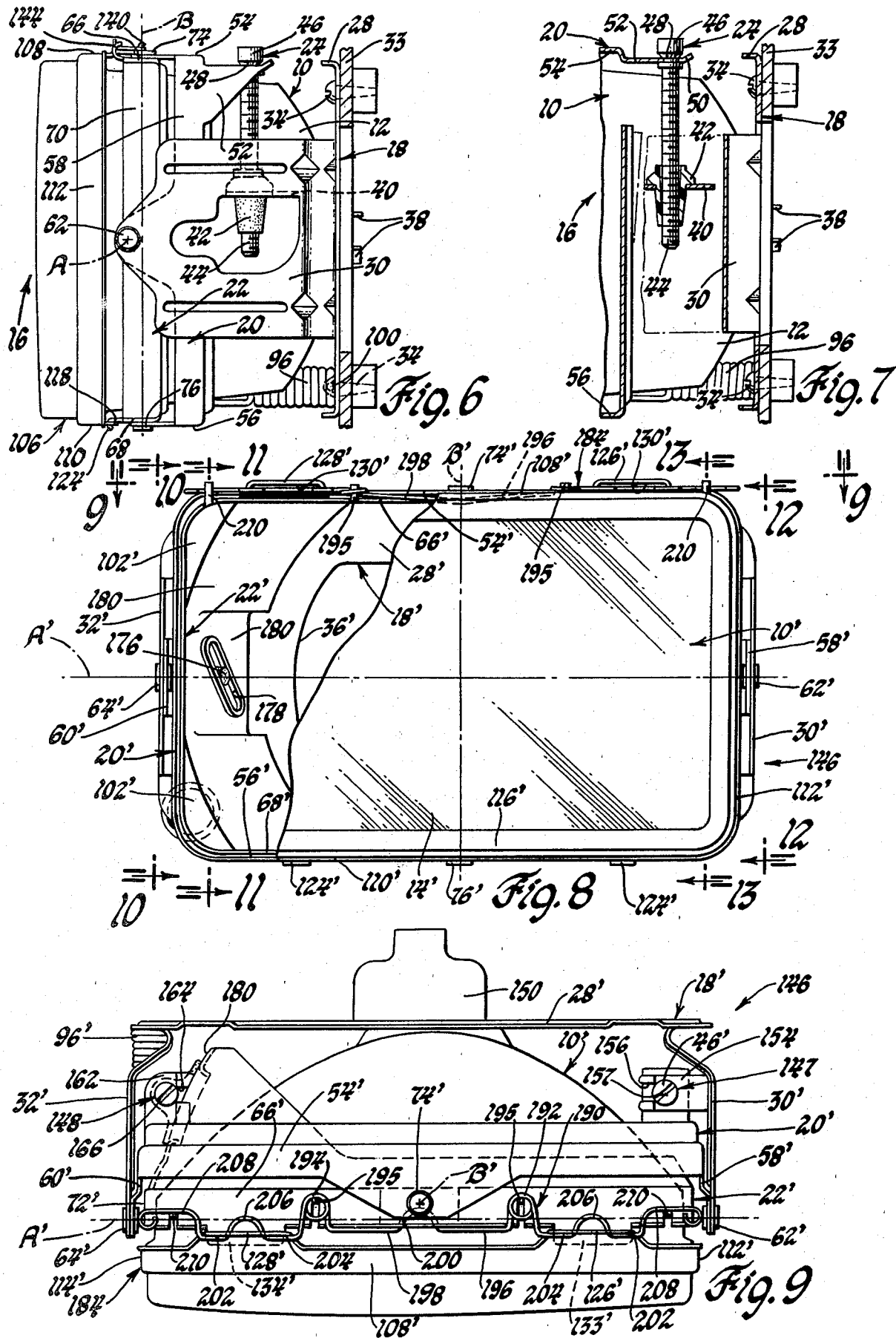

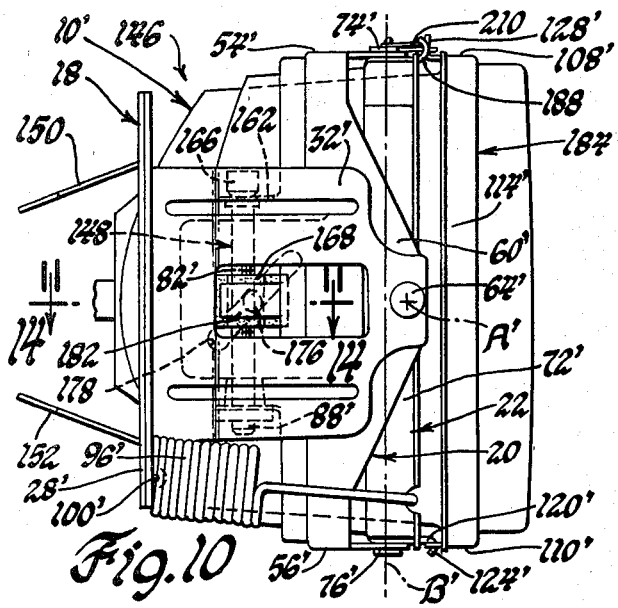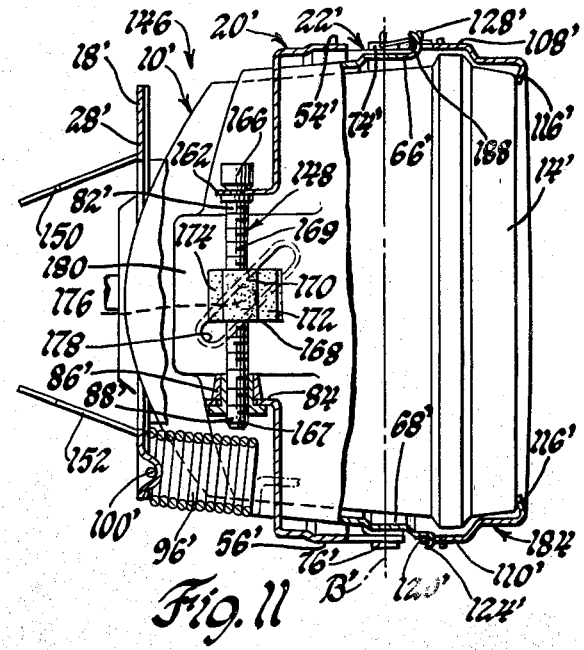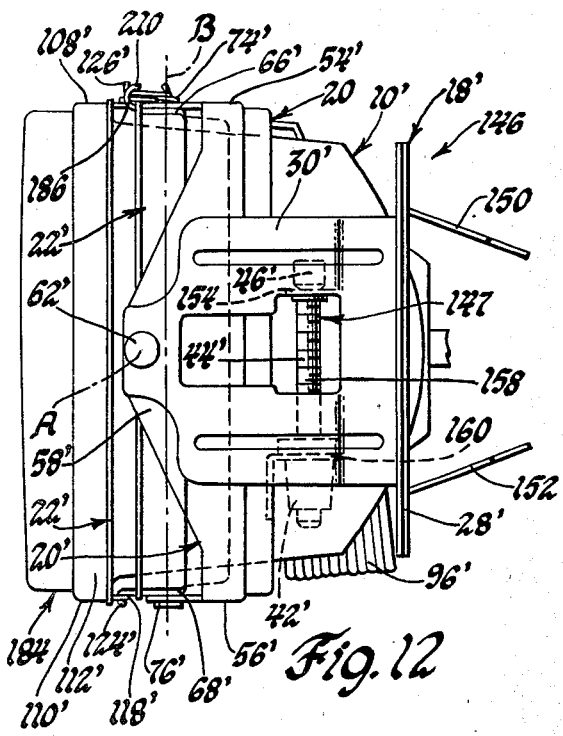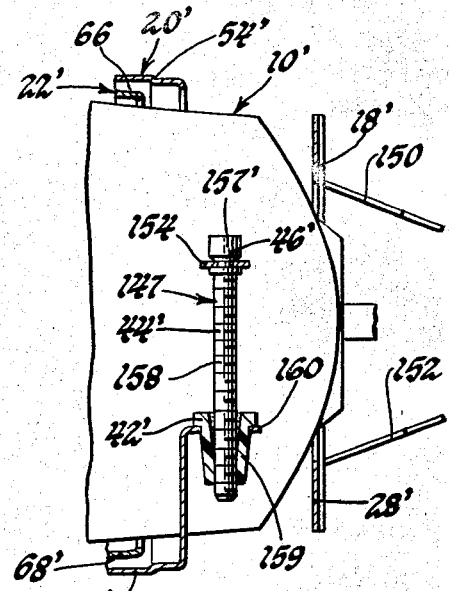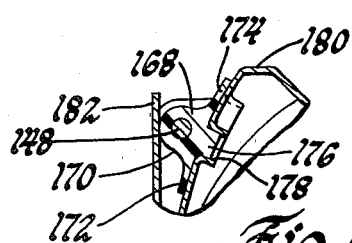

SUPPORT HOUSING FOR A VEHICLE HEADLAMP

This invention relates to vehicle headlamps and more particularly to a support housing for a rectangular headlamp and which can be attached to the front end of a vehicle body and provides adjustable movement of the headlamp about a pair of mutually perpendicular pivot axes for aiming the headlamp relative to the vehicle.

More specifically, the headlamp support housing made according to the present invention includes a bracket member having an upright mounting portion adapted to be secured to a vehicle body. A pair of laterally spaced arms project horizontally outwardly from the opposite ends of the mounting portion and serve to support a first rectangular ring member for pivotal movement about a first pivot axis. A second rectangular ring member is located within the first ring member and connected thereto for pivotal movement about a second pivot axis perpendicular to the first pivot axis. Each corner of the second ring member is formed with a radially inwardly extending locator portion having a vertically oriented planar surface against which rests one of the usual four seating pads on the rear of the headlamp reflector. The headlamp is thus properly positioned relative to the second ring member and maintained in fixed relationship therewith by a removable retainer member attached to the second ring member by a spring clip arrangement. In addition, adjustment of the headlamp about the first and second pivot axes for aiming purposes is provided by a pair of vertically oriented adjustment screws, each of which is located adjacent one of the arms formed with the mounting portion of the bracket member.

The objects of the present invention are: to provide a new and improved support housing for a vehicle headlamp that includes a pair of ring members adjustable about a pair of mutually perpendicular pivot axes by a pair of adjustment screws located within the peripheral confines of the lens of the headlamp; to provide a new and improved support housing for a vehicle headlamp having a pair of vertically oriented adjustment screws accessible from above the support housing for adjusting the position of the headlamp about a pair of mutually perpendicular pivot axes; to provide a new and improved headlamp support housing having a pair of vertically oriented adjustment screws which are located to the rear of the headlamp lens but within the outer limits thereof so as to provide a compact mounting unit; to provide a new and improved support housing which supports a vehicle headlamp and permits adjustable movement thereof about a pair of mutually perpendicular pivot axes, and which can be preassembled and shipped to a vehicle manufacturer for direct mounting on a flat surface of a vehicle; and to provide a new and improved support housing for supporting and adjusting the position of a headlamp and which can be readily attached to a vehicle and arranged in pairs, either side-by-side or vertically stacked, with one support housing above the other.

These and other objects and advantages of the invention will be apparent from the following detailed description taken in conjunction with the accompanying drawings, in which:

FIG. 1 is a front elevational view of a support housing made in accordance with the present invention, with a partially broken-away rectangular headlamp mounted therein;

FIG. 2 is a plan view of the upper portion of the support housing taken on line 2—2 of FIG. 1;

FIG. 3 is a fragmentary plan view of the lower portion of the support housing taken on line 3—3 of FIG. 1;

FIG. 4 is an elevational view taken on line 4—4 of FIG. 1 showing one side of the support housing;

FIG. 5 is a fragmentary sectional view taken on line 5—5 of FIG. 1 showing more clearly one of the two adjustment screws incorporated in the support housing;

FIG. 6 is an elevational view taken on line 6—6 of FIG. 1 showing the other side of the support housing;

FIG. 7 is a fragmentary sectional view taken on line 7—7 of FIG. 1 showing more clearly the other adjustment screw incorporated in the support housing;

FIG. 8 is a front elevational view of a rectangular headlamp mounted in a modified version of the support housing shown in FIGS. 1 through 7;

FIG. 9 is a plan view taken on line 9—9 of FIG. 8 showing the top portion of the modified support housing;

FIG. 10 is an elevational view taken on line 10—10 of FIG. 8 showing one of the two sides of the modified support housing;

FIG. 11 is a sectional view taken on line 11—11 of FIG. 8 showing one of the two adjustment screws incorporated in the modified support housing;

FIG. 12 is an elevational view taken on line 12—12 of FIG. 8 showing the other side of the modified support housing;

FIG. 13 is a fragmentary sectional view taken on line 13—13 of FIG. 8 showing the other adjustment screw incorporated in the modified support housing; and FIG. 14 is a fragmentary sectional view taken on line 14—14 of FIG. 10.

Referring now to the drawings and more particularly to FIGS. 1 through 4, a conventional rectangular vehicle headlamp 10, comprising a reflector 12 and lens 14, is shown mounted within a support housing 16 made in accordance with the present invention. In general, the support housing 16 includes a bracket member 18, a pair of pivotally interconnected rectangular ring members 20 and 22, and a pair of vertically oriented adjustment screws 24 and 26 which provide aiming adjustment of the headlamp 10 about a horizontal pivot axis identified by the letter A and a vertical pivot axis identified by the letter B in FIGS. 2 and 4. Each of the adjustment screws 24 and 26 is accessible from above the support housing 16 and is located to the rear of the headlamp lens 14 but within the peripheral confines thereof as seen in FIGS. 1 and 2.

More specifically, the bracket member 18 comprises a vertically oriented mounting portion 28 integrally formed with a pair of horizontally projecting arms 30 and 32. The mounting portion 28 is rigidly attached to the body 33 of the vehicle by a plurality of threaded fasteners 34, and is formed with an enlarged aperture 36 (FIG. 5) through which the terminal members 38 of the headlamp 10 extend for connection with the usual connector (not shown) which forms a part of the vehicle wiring harness. As seen in FIGS. 2, 6, and 7, the arm 30 of the bracket member 18 is integrally formed with an inwardly directed tongue 40 which supports a tapered nut 42. The lower end of nut 42 threadably receives the lower threaded end 44 of the adjustment screw 24, the slotted head-end 46 of which is formed with a reduced neck portion 48 which, in this case, is located in a U-slot 50 formed in a rearwardly projecting flange 52. For reasons to be explained hereinafter, the U-slot 50 in the flange 52 allows the adjustment screw 24 to be rotated about its longitudinal center axis but prevents axial movement of the adjustment screw 24 relative to the flange 52.

As seen in FIGS. 1-4, the ring member 20 is located between the arms 30 and 32 of the bracket member 18, and is formed as a sheet metal stamping of generally rectangular configuration. The ring member 20 comprises parallel and vertically spaced top and bottom wall members 54 and 56 connected to a pair of horizontally spaced side wall members 58 and 60. As seen in FIG. 2, the aforementioned flange 52 is integrally formed with the top wall member 54 of ring member 20, while the side wall members 58 and 60 are respectively connected to the arms 30 and 32 of the bracket member 18 by the horizontally aligned pivotal connections 62 and 64 which permit the ring member 20 to pivot about the horizontal pivot axis A relative to the fixed bracket member 18 when the adjustment screw 24 is threaded into or out of the nut 42.

Similarly, the ring member 22 is a sheet metal stamping generally of rectangular configuration, and of slightly smaller size than ring member 20 so as to allow ring member 22 to be located within and in close proximity to ring member 20. The ring member 22 comprises parallel vertically spaced top and bottom wall members 66 and 68 connected to a pair of horizontally spaced side wall members 70 and 72. The top and bottom wall members 66 and 68 of ring member 22 are connected to corresponding top and bottom wall members 54 and 56 of ring member 20 by vertically aligned pivotal connections 74 and 76 which allow the ring member 22 to pivot about the vertical axis B relative to ring member 20, under the control of the adjustment screw 26 carried by the ring member 20. In this regard—and as seen in FIGS. 4 and 5, the side wall member 60 of ring member 20 is integrally formed with a rearwardly projecting flange 78 rigidly supporting a nut 80 which threadably receives the threaded shank portion 82 of the adjustment screw 26. A similar flange 84 is located directly below flange 78 and is integrally formed with the side wall member 60 of ring member 20. A bushing 86 for guiding the lower end 88 of the adjustment screw 26 is fixed to the flange 84. The intermediate portion of the shank portion 82 of adjustment screw 26 has a conical cam member 90 secured thereto and adapted to engage a ramp 92 formed on a follower member 94 integrally formed with the side wall member 72 of the ring member 22. The ramp 92 is maintained in engagement with the cam member 90 by a coil spring 96—one end 98 of which is connected to the lower end of the side wall member 72 of ring member 22, while the other end 100 of the spring 96 is connected to the mounting portion 28 of the bracket member 18. Thus, by rotating the slotted head-end 101 of the adjustment screw 26 in one direction, the cam member 90 can be moved vertically from the full-line position to the phantom line position shown in FIG. 3, causing the follower member 94 to move horizontally outwardly from the full-line position to the phantom line position and, accordingly, the ring member 22 is positioned about the vertical pivot axis B which passes through the centers of pivotal connections 74 and 76.

The headlamp 10 is carried by the ring member 22 and it will be noted that, as seen in FIG. 1, each corner of ring member 22 is integrally formed with a radially inwardly extending locator portion having a vertically oriented planar surface 102 against which one of the four corner seating pads 104 (FIG. 3) formed on the rear of the reflector 12 is seated for properly locating the headlamp 10 relative to the ring member 22. A retainer member 106, in the form of a rectangular frame, surrounds the lens 14 of headlamp 10 and serves to press and maintain the seating pads 104 of the headlamp 10 firmly in contact with the surfaces 102 of the locator portions formed on the ring member 22. As is conventional, the retainer member 106 includes parallel and vertically spaced top and bottom wall sections 108 and 110 which connect with a pair of parallel and horizontally spaced side wall sections 112 and 114. The top and bottom wall sections 108 and 110 and side wall sections 112 and 114 are integrally formed with a radially inwardly extending rim 116 which contacts the frontal portion of the lens 14. As seen in FIGS. 3, 4 and 6, the bottom wall section 110 of the retainer member 106 is formed with a pair of identical ears 118 and 120 which are spaced an equal distance from the side wall sections 112 and 114, respectively. Each ear 118 and 120 has an aperture 122 formed therein that receives a hook 124 rigidly formed with the bottom wall member 68 of the ring member 22. In this manner, the bottom wall section 110 of the retainer member 106 is connected to the ring member 22.

As seen in FIGS. 1 and 2, a pair of horizontally spaced and upwardly extending flanges 126 and 128 are formed with the top wall section 108 of the retainer member 106. Each of the flanges 126 and 128 has an elongated horizontal slot 130 (FIG. 1) formed therein and cooperates with a spring clip member 132 for connecting the top wall section 108 of the retainer member 106 to the ring member 22. It will be noted that the flanges 126 and 128 are respectively seated on lips 133 and 134 extending forwardly from the top wall member 66 of the ring member 22. It will also be noted that each spring clip member 132 includes a pair of legs 135 and 136 connected to a loop section 138 which is held by a hook 140 rigidly formed on the top wall member 66 of the ring member 22. The legs 135 and 136 extend through the slot 130 of the associated flange 126, 128, formed on the retainer member 106 and each leg 135, 136 terminates with a tang 142. As seen in FIG. 2, each leg 135 and 136 is bent rearwardly and engages a hook 144 rigidly formed with the front edge of the ring member 22.

Thus when it is necessary to remove the headlamp 10 from the ring member 22, the tangs 142 of each spring clip member 132 are initially manually bent rearwardly to disengage the legs 135 and 136 from the hooks 144 after which the legs 135 and 136 are raised upwardly to clear the hooks 144 and permitted to assume an unflexed position shown in phantom lines in FIG. 2. The tangs 142 of each spring clip member 132 are then manually pressed together and the top wall section 108 of the retainer member 106 is pivoted, as seen in phantom lines in FIG. 4, about the hooks 124 of ring member 22 permitting the slot 130 of each flange 126 and 128 to clear the raised legs 135 and 136 of the associated spring clip member 132. The ears 118 and 120 are then released from engagement with the hooks 124 and the retainer member 106 is removed from the support housing 16.

As should be apparent, the procedure set forth above fo removing the retainer member 106 is reversed when it is desired to mount a headlamp in the support housing 16.

As should be apparent from the above description, when it is desired to aim the headlamp 10 about the horizontal pivot axis A, a screwdriver is used to rotate the adjustment screw 24 in a clockwise or counterclockwise direction, as seen in FIG. 2. If rotated in a clockwise direction, the adjustment screw 24 will move axially into the nut 42 and simultaneously the head-end 46 will tilt rearwardly as seen in FIG. 6, causing the flange 52 to be drawn towards the mounting portion 28. As a result, the ring members 20 and 22 together with the headlamp 10 pivot as a unit in a clockwise direction about the horizontal pivot axis A. The nut 42, as seen in FIG. 7, has the lower portion thereof only formed with threads which engage the threads of the adjustment screw 24. Accordingly, the adjustment screw 24 when screwed into the nut 42 will tilt rearwardly, as aforementioned. Conversely, when the adjustment screw 24 is rotated counterclockwise, as seen in FIG. 2, so as to cause the adjustment screw 24 to be moved axially out of the nut 42, the lower portion of the adjustment screw 24 will pivot about the nut 42 and the head-end 46 will tilt forwardly so as to cause the flange 52 to be moved away from the mounting portion 28 with resultant counterclockwise movement of the ring members 20 and 22 and the headlamp 10 about the horizontal pivot axis A as seen in FIG. 6.

Aiming of the headlamp 10 about the vertical pivot axis B is effected by clockwise or counterclockwise rotation of the adjustment screw 26 as seen in FIGS. 2 and 4. Thus, when the adjustment screw 26 is rotated clockwise, as seen in FIG. 2, the screw 26 will move axially downwardly into the nut 80 under the guiding control of the bushing 86. The downward movement of the screw 26 causes corresponding movement of the cam member 90 which results in outward movement of the follower member 94 against the bias of the coil spring 96. Inasmuch as the follower member 94 is integral with the side wall member 72 of ring member 22, the ring member 22 and the supported headlamp 10 are, accordingly, pivoted in a counterclockwise direction about the vertical pivot axis B as seen in FIG. 2. Conversely, rotation of the adjustment screw 26 in a counterclockwise direction, as seen in FIGS. 2 and 4, causes the adjustment screw 26 and the attached cam member 90 to be moved axially upwardly relative to the follower member 94. As a result, the bias of spring 96 causes the follower member 94 and the integrally formed side wall member 72 to move toward the mounting portion 28 so that the ring member 22 and the headlamp 10 pivot in a clockwise direction about the vertical pivot axis B as seen in FIG. 2.

It will be noted that the full line and phantom line positions of the cam member 90 and the follower member 94 as seen in FIG. 5, are the extreme positions assumed by these members during the rotation of the adjustment screw 26.

FIGS. 8 through 14 of the drawings show a support housing 146 which is a modified form of the support housing 16 shown in FIGS. 1 through 7. Basically, the difference between the support housing 146 and the support housing 16 is in the type of adjustment screw arrangement provided for moving the headlamp about the horizontal and vertical pivot axes and also in the type of the spring clip used for securing the retainer member to the support housing for mounting the headlamp therein. Therefore, inasmuch as the support housing 146 is essentially the same in construction and function as the support housing 16, the parts of the support housing 146 corresponding to the parts of the support housing 16 are identified by the same reference numerals but primed.

Referring now to FIGS. 8 and 9, it can be seen that as in the case of support housing 16 the support housing 146 includes a bracket member 18' and a pair of rectangular ring members 20' and 22' which are pivotally interconnected so as to provide aiming adjustment of the rectangular headlamp 10' about a horizontal pivot axis A' and a vertical pivot axis B'. In this case, adjustment of the headlamp 10' about the horizontal pivot axis A' and the vertical pivot axis B' is achieved by manual rotation of a pair of vertically oriented adjustment screws 147 and 148 located within the peripheral confines of the lens 14' as seen in FIG. 8 and accessible from the top of the support housing 146.

As best seen in FIGS. 9 and 10, the bracket member 18' includes a vertically oriented mounting portion 28' rigidly formed with rearwardly projecting headlamp terminal guard members 150 and 152 and a pair of parallel and horizontally forwardly projecting arms 30' and 32'. Although not shown, the mounting portion 28' of the bracket member 18' has apertures formed therein which allow the bracket member 18' to be secured to a vehicle body in the manner of support housing 16. Also, the mounting portion 28' includes an enlarged centrally located aperture 36' permitting the terminals (not shown) of headlamp 10' to extend rearwardly beyond the mounting portion 28' for electrical connection with the usual connector carried by the vehicle wiring harness.

The ring members 20' and 22' are located between the arms 30' and 32' of the bracket member 18' and, as seen in FIGS. 8, 9, 10 and 12, the side wall members 58' and 60' of the ring member 20' are connected to the arms 30' and 32', respectively, by horizontally aligned pivotal connections 62' and 64' which allow the ring member 20' to be adjusted about the horizontal pivot axis A'. The top and bottom wall members 66' and 68' of the ring member 22' are located between the top and bottom wall members 54' and 56' of the ring member 20' and are respectively connected thereto by vertically aligned pivotal connections 74' and 76' which allow the ring member 22' to pivot about the vertical pivot axis B' relative to the ring member 20' for aiming the headlamp 10'.

As aforementioned, the adjustment of the headlamp 10' is realized by rotation of the adjustment screws 147 amd 148, and in this regard, it will be noted that a flange 154 (FIGS. 9 and 12) fixed to the arm 30' of bracket member 18' has a U-slot 156 formed therein which supports the slotted head-end 157 of the adjustment screw 147 for rotation relative to the flange 154. The threaded shank 158 of the adjustment screw 147 is threadably received by the nut 159 rigidly mounted within a flange 160 located below flange 154 and integrally formed with the side wall member 58' of the ring member 20'. Rotation of the adjustment screw 147 in one direction or the others, cause the threaded shank 158 to be threaded into or out of the nut 159 causing the flange 160 to move upwardly or downwardly and as a result the ring members 20' and 22', and accordingly, the headlamp 10' is adjusted in position about the horizontal pivot axis A' defined by pivotal connections 62' and 64'.

As to the adjustment of the headlamp 10' about the vertical pivot axis B', it will be noted that, as seen in FIGS. 9, 10, 11 and 14, the side wall member 60' of the ring member 20' includes a rearwardly extending flange 162 formed with a U-slot 164 which carries the slotted head-end 166 of adjustment screw 148. The U-slot 164 allows rotation of the adjustment screw 148 about its longitudinal axis but prevents axial movement of the adjustment screw 148 relative to the flange 162. The lower end 167 of the adjustment screw 148 is received by a bushing 86' fixed within the flange 84' which extends rearwardly from and is rigidly connected to the side wall member 60' of the ring member 20'. Intermediate the head-end 166 and the lower end 167 of the adjustment screw 148, a nut 168 is threadably mounted on the threaded shank portion 169 of the adjustment screw 148. As seen in FIG. 14, the nut 168 includes a body portion 170 formed with oppositely extending arms 172 and 174 and has a cylindrical projection or pin 176 which extends into a slot 178 formed in a spherical section 180 which is integral with and extends rearwardly from the side wall section 72' of the ring member 22'.

As best seen in FIGS. 10 and 11, the longitudinal center axis of the slot 178 is inclined at an angle of approximately 45° to an imaginary horizontal plane passing through the horizontal pivot axis A' so that upon rotation of the adjustment screw 148 in one direction or the other, the nut 168 moves upwardly or downwardly along the shank portion 169 of the adjustment screw 148 and causes the projection 176 to move to different positions within the slot 178. As a result, the spherical section 180 and, accordingly, the attached ring member 22' and headlamp 10' are movable about the vertical pivot axis B'. It will also be noted that as seen in FIGS. 10 and 14, a spring arm 182 integrally formed with the side wall member 72' of ring member 22' serves to bias the arms 172 and 174 of the nut 168 into surface contact with the spherical section 180 so as to maintain the cylindrical projection 176 in the slot 178 while the adjustment screw 148 is being rotated.

The retainer member 184 which serves to maintain the headlamp 10' within the ring member 22', of the support housing 146, is structurally similar to the retainer member 106 employed by the support housing 16 in that the retainer member 184 is also rectangular in configuration and includes top and bottom parallel wall sections 108' and 110' and a pair of parallel side wall sections 112' and 114' each formed with a radially inwardly extending rim 116'. Also, as in the case of the retainer member 106, the bottom wall section 110' of the retainer member 184 is formed with a pair of rearwardly extending apertured ears 118' and 120' while the top wall section 108' includes a pair of flange portions 126' and 128' each of which has a horizontal slot 130' formed therein. Each of the ears 118' and 120' is mounted on a hook 124' integrally formed with the front edge of the bottom wall member 68' of the ring membe 22' while the flange portions 126' and 128' seat upon outwardly extending lips 133' and 134' respectively, integrally formed with the front edge of the top wall member 66' of the ring member 22'.

Rather than having separate spring clips as found in support housing 16 for connecting each of the flange portions 126' and 128' to the ring member 22', a unitary spring clip 190 (FIG. 9) made from a single strand of spring wire is provided which includes a pair of identical loop sections 192 and 194 each of which is retained by a hook 195 fixed to the top wall member 66' of the ring member 22'. The loop sections 192 and 194 are interconnected by an intermediate section consisting of a pair of axially aligned straight portions 196 and 198 connected to a U-shaped portion 200 located midway between the loop sections 192 and 194. A leg section is also connected to each of the loop sections 192 and 194 and each leg section consists of a pair of straight portions 202 and 204 which are located in a vertical plane forwardly offset from and parallel to a vertical plane passing through the straight portions 196 and 198 of the intermediate section of the spring clip 190. A U-shaped portion 206, which is substantially the same in size as the U-shaped portion 200, extends through the slot 130' of the associated flange portion and interconnects the straight portions 202 and 204. In addition, each leg section terminates with a straight portion 208 which engages a hook 210 formed on the front edge of the ring member 22' adjacent each side wall member thereof and connects with a straight portion 202. The straight portions 208 are located in a vertical plane rearwardly offset from and parallel to a vertical plane passing through the straight portions 196 and 198.

As seen in FIG. 9, the retainer member 184 can be released from the ring member 22' for removal of headlamp 10' by initially bending the straight portion 208 of each leg section rearwardly towards the mounting portion 28' to disengage each leg section from the hook 210 after which the straight portion 208 is raised upwardly of the top wall member 66' of ring member 22' to clear the hook 210. Each leg section is then bent forwardly to remove the U-shaped portion 206 from the accommodating slot 130' after which the top wall section 108' is tilted about the hooks 124' (FIG. 10) to remove the retainer member 184.

Various changes and further modifications can be made in the construction of this headlamp support housing without departing from the spirit of the invention. Such changes and modifications are contemplated by the inventor, and he does not wish to be limited except by the scope of the appended claims.

The embodiments of the invention in which an exclusive property or privilege is claimed are defined as follows:

1. A support housing attachable to a vehicle body at the front end thereof and adapted to support and provide adjustable aiming movement of a headlamp about a pair of mutually perpendicular first and second pivot axes, said support housing including a bracket member comprising a mounting portion adapted to be secured to said vehicle body and a pair of laterally spaced arms fixed to the opposite end of said mounting portion, said arms extending horizontally outwardly from said mounting portion; a first ring member supported between said arms for pivotal movement about said first pivot axis, a second ring member located within said first ring member and being supported by said first ring member for pivotal movement about said second pivot axis, said second ring member having locator surfaces for engaging seating pads formed on the rear portion of said headlamp; a retainer member removably attched to said second ring member and surrounding the lens of said headlamp for maintaining said seating pads on said rear portion of said headlamp firmly in contact with said locator surfaces; a first adjustment screw located between said bracket member and said first ring member for adjusting the position of said headlamp about said first pivot axis, and a second adjustment screw located between said first and second ring members for adjusting the position of said headlamp about said pivot axis, said first and second adjustment screws being located within the peripheral confines of the lens of said headlamp.

2. A support housing attachable to a vehicle body at the front end thereof and adapted to support and provide adjustable aiming movement of a headlamp about a pair of mutually perpendicular first and second pivot axes, said support housing including a bracket member comprising a mounting portion adapted to be secured to said vehicle body and a pair of laterally spaced arms fixed to the opposite ends of said mounting portion, said arms extending horizontally outwardly from said mounting portion; a first ring member supported between said arms for pivotal movement about said first pivot axis, a second ring member located within said first ring member and being supported by said first ring member for pivotal movement about said second pivot axis, said second ring member having locator surfaces for engaging seating pads formed on the rear portion of said headlamp; a retainer member removably attached to said second ring member and surrounding the lens of said headlamp for maintaining said seating pads on said rear portion of said headlamp firmly in contact with said locator surfaces; a first verically oriented adjustment screw located between said bracket member and said first ring member for adjusting the position of said headlamp about said first pivot axis, and a second vertically oriented adjustment screw located between said first and second ring members for adjusting the position of said headlamp about said second pivot axis, said first and second adjustment screws being located within the peripheral confines of the lens of said headlamp and each of said first and second adjustment screws having a head-end accessible from above said support housing for rotating said first and second adjustment screws.

3. A support housing attachable to a vehicle body at the front end thereof and adapted to support and provide adjustable aiming movement of a headlamp about a pair of mutually perpendicular first and second pivot axes, said support housing including a bracket member comprising a vertically oriented mounting portion adapted to be secured to said vehicle body and a pair of laterally spaced arms fixed to the opposite end of said mounting portion, said arms extending horizontally outwardly from said mounting portion; a first ring member supported between said arms for pivotal movement about said first pivot axis, a second ring member located within said first ring member and being supported by said first ring member for pivotal movement about said second pivot axis, said second ring member having a ramp member connected thereto, locator surfaces formed on said second ring member for engaging seating pads formed on the rear portion of said headlamp; a retainer member removably attached to said second ring member and surrounding the lens of said headlamp for maintaining said seating pads on said rear portion of said headlamp firmly in contact with said locator surfaces; a first adjustment screw connecting said bracket member to said first ring member for adjusting the position of said headlamp about said first pivot axis, a second adjustment screw carried by said first ring member and having a cam connected thereto which engages said ramp member for adjusting the position of said headlamp about said second pivot axis when said second adjustment screw is rotated in one direction or the other, and a spring connecting said second ring member to said bracket member for maintaining said ramp member of said second ring member in engagement with said conical cam, said first and second adjustment screws being located within the peripheral confines of the lens of said headlamp.

* * * * *